United States Patent
Bandou et al.

(10) Patent No.: US 10,657,805 B2
(45) Date of Patent: May 19, 2020

(54) VEHICLE TO VEHICLE COMMUNICATION DEVICE

(71) Applicant: Hitachi, Ltd., Tokyo (JP)

(72) Inventors: Mikio Bandou, Tokyo (JP); Yukihiro Kawamata, Tokyo (JP); Akira Maeki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/342,331

(22) PCT Filed: Oct. 24, 2017

(86) PCT No.: PCT/JP2017/038269
§ 371 (c)(1),
(2) Date: Apr. 16, 2019

(87) PCT Pub. No.: WO2018/088194
PCT Pub. Date: May 17, 2018

(65) Prior Publication Data
US 2019/0279501 A1    Sep. 12, 2019

(30) Foreign Application Priority Data

Nov. 8, 2016 (JP) .................................. 2016-217726

(51) Int. Cl.
*G08G 1/01* (2006.01)
*H04W 4/46* (2018.01)
(Continued)

(52) U.S. Cl.
CPC ........... *G08G 1/0112* (2013.01); *G01C 21/28* (2013.01); *G01S 19/51* (2013.01); *G08G 1/0125* (2013.01);
(Continued)

(58) Field of Classification Search
CPC .................................................. G08G 1/0112
See application file for complete search history.

(56) References Cited

U.S. PATENT DOCUMENTS

| 2011/0054790 A1* | 3/2011 | Kagawa | G01S 5/0072 |
| | | | 701/472 |
| 2013/0151136 A1* | 6/2013 | Oh | G01S 19/14 |
| | | | 701/300 |
| 2015/0254977 A1* | 9/2015 | Grabow | G08G 1/0141 |
| | | | 340/903 |

FOREIGN PATENT DOCUMENTS

JP    2009-264977 A    11/2009
JP    2010-213044 A    9/2010
(Continued)

OTHER PUBLICATIONS

International Search Report of PCT/JP2017/038269 dated Jan. 30, 2018.
Japanese Office Action received in corresponding Japanese Application No. 2018-550117 dated Dec. 3, 2019.

*Primary Examiner* — Joseph T Phan
(74) *Attorney, Agent, or Firm* — Mattingly & Malur, PC

(57) ABSTRACT

A vehicle to vehicle communication device including a satellite vehicle signal reception means for suppressing a decrease in relative position accuracy with a small communication amount during a unit time, a communication means, a kinematic acquisition means, a positioning means, a first vehicle information storage means, a second vehicle information storage means configured to record satellite vehicle information and the velocity vector of the second vehicle in each time, a relative position calculation means configured to calculate a relative position from the velocity vector of the first vehicle, the velocity vector of the second vehicle, and the satellite vehicle information, a requested satellite vehicle number generation means configured to generate a requested satellite vehicle number notifying the second vehicle of a satellite vehicle number observed by the first vehicle, and a transmitting satellite vehicle information generation means (Continued)

configured to generate information to be sequentially transmitted to the second vehicle.

3 Claims, 6 Drawing Sheets

(51) Int. Cl.
*G01S 19/51* (2010.01)
*G08G 1/052* (2006.01)
*H04B 7/185* (2006.01)
*G01C 21/28* (2006.01)
*G08G 1/09* (2006.01)

(52) U.S. Cl.
CPC ............... *G08G 1/052* (2013.01); *G08G 1/09* (2013.01); *H04B 7/18523* (2013.01); *H04W 4/46* (2018.02)

(56) References Cited

FOREIGN PATENT DOCUMENTS

| | | | |
|---|---|---|---|
| JP | 2012-211843 A | 11/2012 |
| JP | 2013-122742 A | 6/2013 |
| JP | 2013-156721 A | 8/2013 |
| JP | 5884170 B2 | 3/2016 |

* cited by examiner

FIG. 3

| 301 | TOTAL NUMBER OF PIECES OF INFORMATION | TOTAL NUMBER OF STORED PIECES OF INFORMATION |
|---|---|---|
| 302 | TOTAL NUMBER OF SATELLITE VEHICLES | TOTAL NUMBER OF RECEIVED SATELLITE VEHICLES |
| 303 | SATELLITE VEHICLE NUMBER (i) | RECEIVED SATELLITE VEHICLE NUMBER (i) |
| 304 | DISTANCE TO SATELLITE VEHICLE (i) | DISTANCE TO SATELLITE VEHICLE CORRESPONDING TO SATELLITE VEHICLE NUMBER (i) |
| 305 | DISTANCE ERROR (i) | DISTANCE ERROR TO SATELLITE VEHICLE CORRESPONDING TO SATELLITE VEHICLE NUMBER (i) |
| 306 | SATELLITE VEHICLE POSITION (i) | SATELLITE VEHICLE POSITION CORRESPONDING TO SATELLITE VEHICLE NUMBER (i) |
|  | ... | 303 TO 306 ABOVE FOR TOTAL NUMBER OF SATELLITE VEHICLES 302 |
| 307 | RECEPTION TIME | RECEIVED TIME |
| 308 | VELOCITY VECTOR | VELOCITY VECTOR OF VEHICLE |

FIG. 4

| | | |
|---|---|---|
| 401 | TIME | |
| 402 | VEHICLE ID | |
| 403 | VELOCITY VECTOR | |
| 404 | SATELLITE VEHICLE OBSERVATION TIME | |
| 405 | TOTAL NUMBER OF PIECES OF SATELLITE VEHICLE INFORMATION | |
| 406 | FIRST SATELLITE VEHICLE INFORMATION IN PRIORITY ORDER | SATELLITE VEHICLE NUMBER — 407 |
| | | DISTANCE TO SATELLITE VEHICLE — 408 |
| | | DISTANCE ERROR — 409 |
| | SECOND SATELLITE VEHICLE INFORMATION IN PRIORITY ORDER | SATELLITE VEHICLE NUMBER |
| | | DISTANCE TO SATELLITE VEHICLE |
| | | DISTANCE ERROR |
| | ... | |
| | m-TH SATELLITE VEHICLE INFORMATION IN PRIORITY ORDER | SATELLITE VEHICLE NUMBER |
| | | DISTANCE TO SATELLITE VEHICLE |
| | | DISTANCE ERROR |

VEHICLE TO VEHICLE COMMUNICATION DEVICE

TECHNICAL FIELD

The present invention relates to a vehicle to vehicle communication device.

BACKGROUND ART

Conventionally, to know a relative position between a plurality of vehicles, a device capable of directly measuring a distance to a vehicle such as a millimeter wave radar is arranged and used, and functions of line traveling and collision warning are realized by control information of a vehicle position and vehicle to vehicle communication of communicating the vehicle position by wireless means. In these functions, the relative position is important information, and in a case where the distance cannot be directly measured by the millimeter wave radar or the like, the relative position can be calculated by exchanging respective positions by vehicle to vehicle communication or the like. However, in a case where different errors occur in the respective positions, all the errors occur as errors of the relative position.

Therefore, in a case of obtaining a relative position with a second vehicle using vehicle to vehicle communication, PTL 1 discloses a method of calculating a position with high accuracy in three or more vehicles by aggregating satellite vehicle information such as pseudo distances and the like observed in the vehicles in one vehicle that serves as a reference vehicle, and positioning and calculating the relative position. Further, PTL 2 discloses a technology enabling calculation of a relative position even with a small number of satellite vehicles by transmitting motion information of vehicles together with a plurality of pieces of satellite vehicle information. By using these methods, the relative position between vehicles can be calculated with high accuracy.

CITATION LIST

Patent Literature

PTL 1: JP 2009-264977 A
PTL 2: JP 5884170 B

SUMMARY OF INVENTION

Technical Problem

In the above disclosed techniques, the relative position can be calculated with high accuracy but information of all the observable or commonly observed satellite vehicles is communicated. Vehicle to vehicle communication is one-to-one communication, and in a case where there is a plurality of communicating parties, communication destinations are switched with very fast sampling. There is no problem if the partner at the time of communication is one, but many of vehicles that perform the vehicle to vehicle communication often have a plurality of vehicles to communicate in the vicinity. For example, in a collision warning at an intersection, the number of close vehicles increases as the intersection becomes larger.

Further, in the line traveling, a plurality of close vehicles surely exists, and an excess of a communication amount occurs as the number of vehicles to communicate becomes larger, and losing, failure, delay, and the like at the communication occur.

An object of the present invention is to suppress a decrease in relative position accuracy with a small communication amount during a unit time.

Solution to Problem

A characteristic of the present invention for solving the above problem is as follows, for example.

A vehicle to vehicle communication device including a satellite vehicle signal reception means configured to decode a signal from a satellite vehicle to receive satellite vehicle information, a communication means configured to receive, by a first vehicle, a second vehicle or a fixed facility, the satellite vehicle information, and a velocity vector representing a motion of the second vehicle, and to transmit a velocity vector of the first vehicle to the second vehicle, a kinematic acquisition means configured to measure or calculate a velocity vector of a vehicle, a positioning means configured to calculate a position of the first vehicle from the signal from the satellite vehicle, a first vehicle information storage means configured to record satellite vehicle information and the velocity vector of the first vehicle in each time, a second vehicle information storage means configured to record satellite vehicle information and the velocity vector of the second vehicle in each time, a relative position calculation means configured to calculate a relative position from the velocity vector of the first vehicle, the velocity vector of the second vehicle, and the satellite vehicle information, a requested satellite vehicle number generation means configured to generate a requested satellite vehicle number notifying the second vehicle of a satellite vehicle number observed by the first vehicle, and a transmitting satellite vehicle information generation means configured to generate, from the satellite vehicle information having the satellite vehicle number requested by the second vehicle, information to be sequentially transmitted to the second vehicle in a priority order by an amount falling within a margin of a communication amount obtainable from the communication means.

Advantageous Effects of Invention

According to the present invention, the decrease in relative position accuracy can be suppressed with a small communication amount during a unit time. Problems, configurations, and effects other than those described above will be clarified from description of the following embodiments.

BRIEF DESCRIPTION OF DRAWINGS

FIG. 3 illustrates a data structure of a storage means.
FIG. 4 illustrates a structure of communication data.

DESCRIPTION OF EMBODIMENTS

Figure 1:
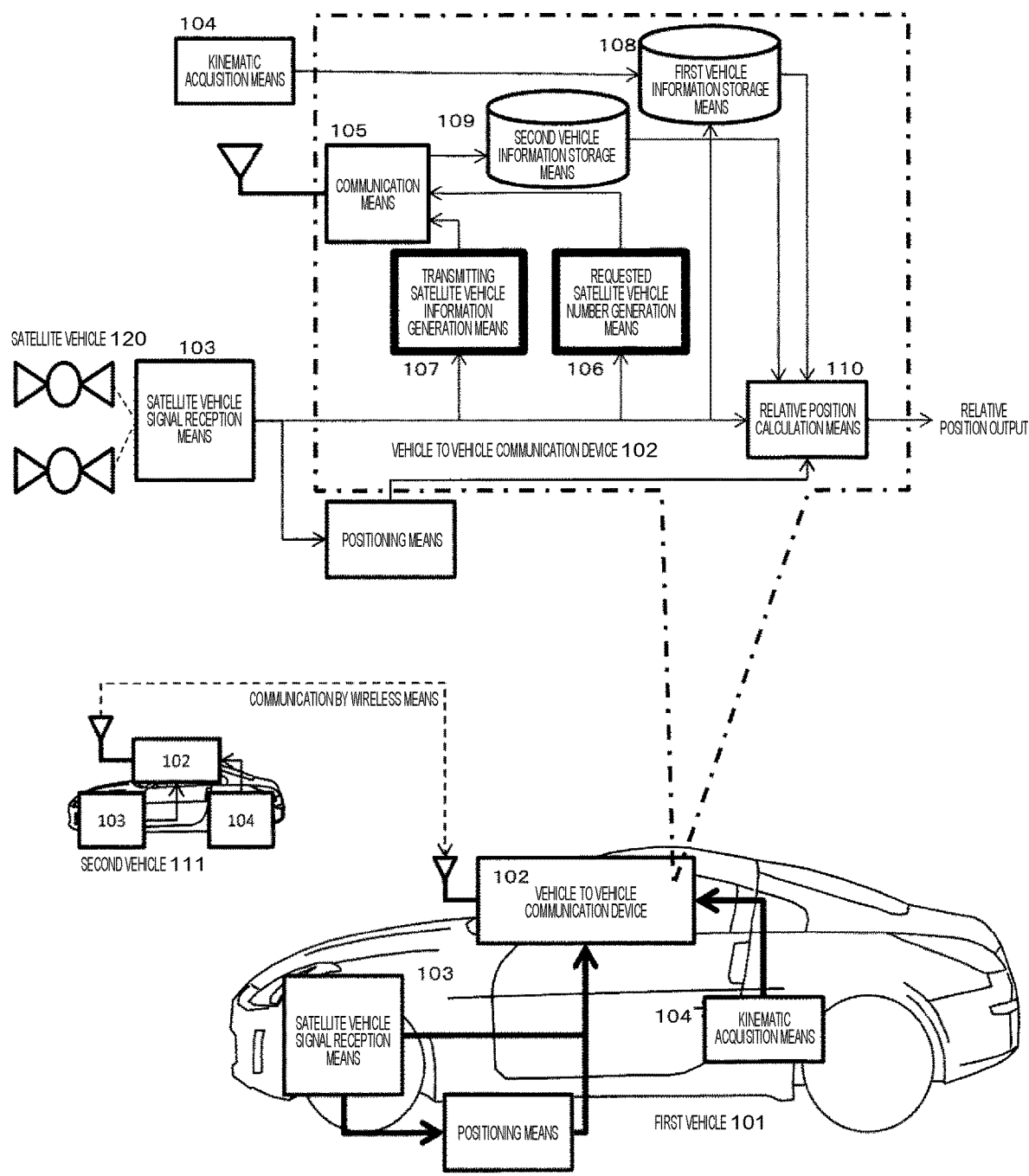
FIG. 1 illustrates a configuration of a vehicle to vehicle communication device.

Hereinafter, an embodiment of the present invention will be described with reference to the drawings. The following description is a specific example of contents of the present invention, and the present invention is not limited to the description. Various alterations and modifications by those skilled in the art can be made within the scope of the technical idea disclosed in this specification. Further, in all the drawings for describing the present invention, the same reference numeral is given to those having the same function, and repetitive description thereof may be omitted.

In positioning of a relative position using a positioning satellite vehicle, errors caused by the positioning satellite vehicle, for example, a satellite vehicle calculation error, a satellite vehicle clock error, an ionospheric delay, and the like are main causes. Transmission of these errors by all of satellite vehicles is wasteful.

In the present invention, a requested satellite vehicle number generation means from a first vehicle that calculates a relative position is included. Numbers specifying satellite vehicles observable by the first vehicle are prioritized and transmitted to a second vehicle, the second vehicle transmits, to the first vehicle, at least two pieces of satellite vehicle information and motion information of the second vehicle according to the priority from among the satellite vehicle numbers requested by the first vehicle, and the first vehicle calculates a relative position on the basis of the transmitted information, thereby suppressing an excess of a communication amount. As described above, in the conventional relative position calculation method using a satellite vehicle positioning result, a decrease in relative position accuracy can be suppressed with a small communication amount during a unit time by prioritizing and communicating satellite vehicles to be used in positioning.

First Embodiment

The present embodiment is configured by a plurality of traveling vehicles only, and is an example of a case where the vehicles have no mutual information before calculating a relative position. FIG. 1 illustrates a configuration example of a first embodiment. FIG. 1 illustrates a configuration of a vehicle to vehicle communication device.

In the present embodiment, a vehicle to vehicle communication device, a satellite vehicle signal reception means that receives a signal of a satellite vehicle 120, and a kinematic acquisition means that measures motions of a vehicle such as a velocity, an acceleration, and an angular velocity of the vehicle are mounted on the vehicle. In addition, times managed by the vehicles are adjusted to a common time, and all the vehicles can be assumed to exist sufficiently close to one another as compared with the distance to satellite vehicles. FIG. 1 illustrates a case configured by a first vehicle 101 and a second vehicle 111 as an example. Each of the first vehicle 101 and the second vehicle 111 includes a vehicle to vehicle communication device 102. Each vehicle to vehicle communication device 102 is configured by a communication means 105 that can communicate with the second vehicle, a requested satellite vehicle number generation means 106 that prioritizes satellite vehicle numbers to be requested to the second vehicle and generates a signal from a satellite vehicle signal received by a satellite vehicle signal reception means 103, a transmitting satellite vehicle information generation means 107 that generates satellite vehicle information to be transmitted according to the priority in a case where communication of a requested satellite vehicle number is given from the second vehicle, a first vehicle information storage means 108 that stores satellite vehicle information and motion information of the first vehicle 101 acquirable from the satellite vehicle signal reception means 103 and a kinematic acquisition means 104 for a certain time, a second vehicle information storage means 109 that stores satellite vehicle information and motion information communicated from the second vehicle for a certain time, and a relative position calculation means 110 that calculates a relative position from the satellite vehicle information and the motion information of the first vehicle and the second vehicle. Directions of the arrows in FIG. 1 represent a flow of data.

In the first embodiment, when the relative position is calculated at 10 Hz, kinematic information can be acquired at 100 Hz. Further, vehicle to vehicle communication can be performed at a higher frequency than a calculation frequency of the relative position.

Figure 2:
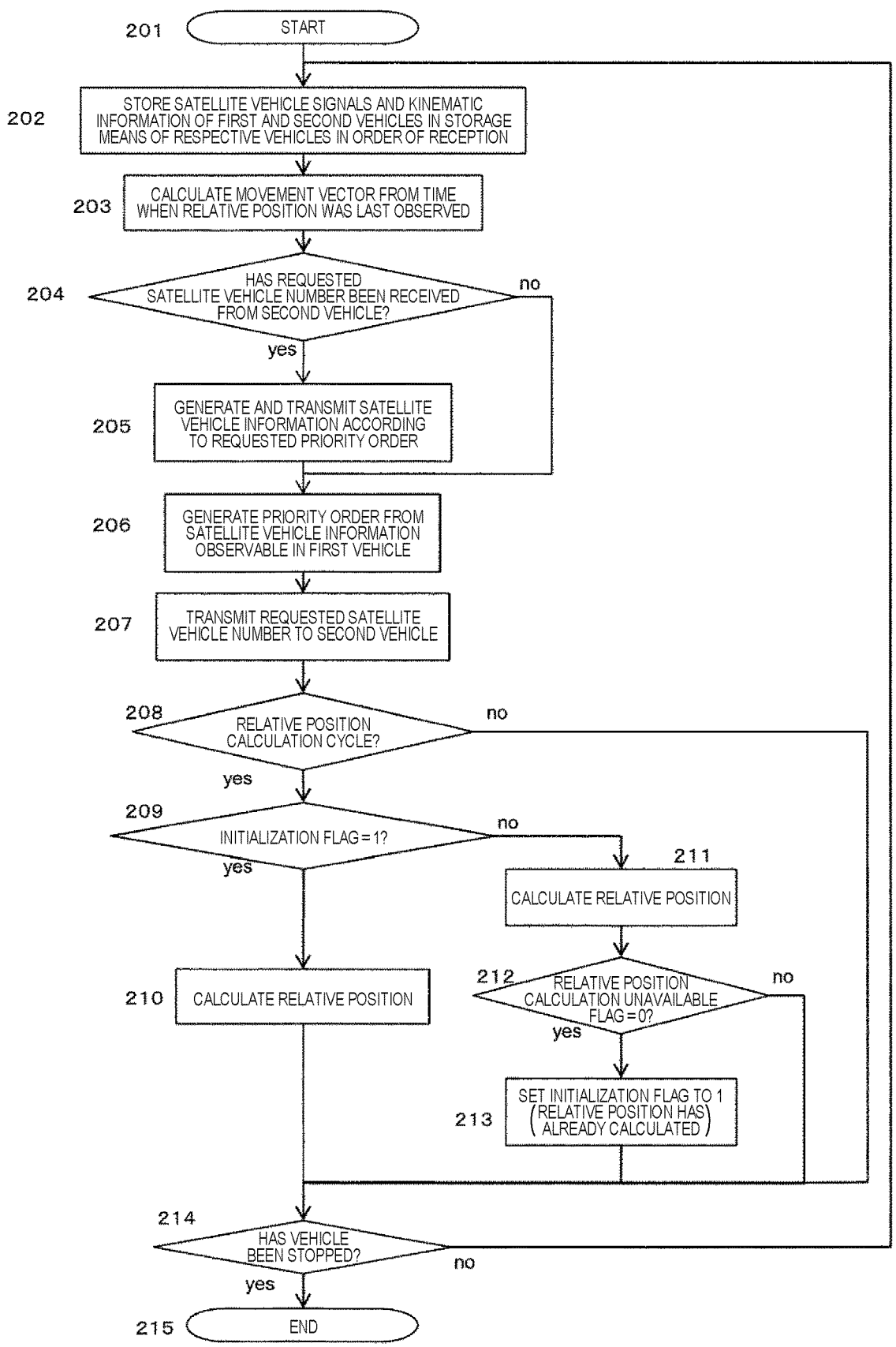
FIG. 2 illustrates a processing flow of the vehicle to vehicle communication device.

Hereinafter, processing by the vehicle to vehicle communication device 102 will be described. FIG. 2 illustrates a processing flow of the vehicle to vehicle communication device. In step 201, the vehicle to vehicle communication device 102 is activated and the processing proceeds to step 202. The activation of the vehicle to vehicle communication device 102 is performed in synchronization with activation of the first vehicle 101, and the processing flow of the vehicle to vehicle communication device 102 proceeds at the same timing with the kinematic acquisition means 104.

The kinematic acquisition means 104 measures or calculates a velocity vector of the first vehicle. The velocity vector has a direction to which a velocity is output and magnitude of the velocity, using the satellite vehicle signal reception means 103 as a starting point, and is expressed by ($\delta x$, $\delta y$, $\delta z$).

In step 202, the information obtained from the satellite vehicle signal reception means 103 and the kinematic acquisition means 104 of the first vehicle 101 is stored in the first vehicle information storage means 108. Further, similarly, the satellite vehicle information and the motion information sent from the second vehicle are stored in the second vehicle information storage means 109. As the satellite vehicle information, the satellite vehicle signal reception means 103 receives a navigation message from a satellite vehicle and converts the navigation message into the satellite vehicle information. The navigation message includes at least a satellite vehicle number, information indicating a position of the satellite vehicle itself, a time at which the satellite vehicle signal has been output, and radio wave intensity of the satellite vehicle signal.

Further, a distance r to the satellite vehicle is obtained as follows from a time ($t_s$) at which the satellite vehicle signal has been output and a time ($t_r$) at which the satellite vehicle signal has been received by a receiver. Note that a light velocity is c.

$$r = c(t_r - t_s) \qquad \text{[Equation 1]}$$

Here, FIG. 3 illustrates an example of a data structure of the first vehicle information storage means 108 and the second vehicle information storage means 109. Both of the storage means have the same structure and sequentially record information according to an acquired time.

The first vehicle information storage means 108 stores the number of all memories stored at a certain time as a total number of pieces of information 301. This means that the information at a certain time is described in or after 302 and also means that information is similarly stored at another time. Next, a total number of received satellite vehicles is stored in a total number of satellite vehicles 302, and a satellite vehicle number 303, a distance to the satellite vehicle 304, a distance error 305 to the satellite vehicle, and a satellite vehicle position 306 are stored. The above 303 to

306 are stored for the received satellite vehicles. Further, a received time 307 is also stored as a time. Further, a velocity vector 308 obtained from the kinematic acquisition means 104 is stored. An initial value of the distance error 306 to the satellite vehicle is 0 and is sequentially rewritten with the distance error calculated after calculation of the relative position.

The second vehicle information storage means 109 stores the information from the second vehicle obtained from the communication means 105 according to the above-described structure.

In step 203, a movement vector of the relative position from the time when the relative position has been last observed is calculated. The movement vector can be obtained by adding up the velocity vectors 308 stored in the first vehicle information storage means 108 and the second vehicle information storage means 109. In a case where the relative position has not been calculated yet, adding up from the oldest time of both the storage means may be adopted. When the calculation of the movement vector is completed, the processing proceeds to step 204.

In step 204, whether a requested satellite vehicle number has been received from the second vehicle 111 is determined. In a case where the requested satellite vehicle number has been received, the processing proceeds to step 205. In a case where the requested satellite vehicle number has not been received, the processing skips step 205 and proceeds to step 206. The requested satellite vehicle numbers are signals in which the satellite vehicle numbers are prioritized and arranged in descending order or ascending order of the priority in order to calculate the relative position in the second vehicle. In a head of the requested satellite vehicle number, a value of an initialization flag indicating whether the relative position has been calculated even once with the communicating vehicle is described. A specific generation method will be described below.

In step 205, the satellite vehicle information is generated in the order of the requested satellite vehicle numbers acquired in step 204. The satellite vehicle information includes at least the satellite vehicle number 303, the distance to the satellite vehicle 304, the distance error 305, and the satellite vehicle position 306. These pieces of information are included in the first vehicle information storage means 108.

Note that, in generating the satellite vehicle information, an allowable value of the communication means 105 is determined in advance, and the satellite vehicle information of a maximum number m that is equal to or less than the allowable value is transmitted. The allowable value can be determined by subtracting a value obtained by multiplying the number of currently communicating vehicles by the minimum required number of pieces of data per vehicle from a theoretical value of a communication speed. FIG. 4 illustrates a structure of communication data. The communication data includes a time 401 of communication, a vehicle ID 402 of a vehicle from which data is transmitted, a velocity vector 403 of a vehicle from which the data is transmitted, an observation time 404 of the satellite vehicle included in the data, a total number of pieces of satellite vehicle information data 405 continued thereafter, and satellite vehicle information 406 arranged in a priority order. The satellite vehicle information 406 includes a satellite vehicle number 407, a distance 408 to the satellite vehicle, and a distance error 409. FIG. 4 illustrates a case including up to m-th satellite vehicle information.

Note that the above-described restriction may be temporarily removed depending on the initialization flag described in the head of the requested satellite vehicle number signal. In other words, in a case where the relative position has not been calculated even once with the communicating vehicle in the initialization flag, at least three pieces of satellite vehicle information are necessarily generated. As a result, when vehicle to vehicle communication is normally operated, the relative position can be calculated with accuracy, and relative positions can be sequentially calculated using the relative position as an initial value. This mechanism will be described in detail below.

Next, in step 206, the priority is generated from the measured satellite vehicle information in the first vehicle information storage means 108. There are various ways of determining the priority, but in the first embodiment, the priority is determined from an elevation angle and radio wave intensity. The elevation angles from 0 to 90 degrees are divided into a plurality of stages. For example, the elevation angles are divided into nine stages, and numbers 1 to 9 are assigned to the satellite vehicle numbers as elevation angle numbers. Then, as the priority, the satellite vehicle numbers are selected one by one in descending order of the elevation angle numbers. If there are satellite vehicle numbers having the same elevation angle number, the priority is assigned in descending order of the radio wave intensity. The priority is uniquely determined by this method. When the priority is determined, signals in which the requested satellite vehicle numbers are arranged in the priority order are generated, and the processing proceeds to step 207.

In step 207, the satellite vehicle numbers arranged in the priority order are transmitted to the second vehicle 111 through the communication means 105, and the processing proceeds to step 208. However, in a case where part or all of the priorities in descending order of the signals in which the requested satellite vehicle numbers are arranged are the same, the satellite numbers may not be transmitted to the second vehicle 111. By not positively communicating the requested satellite vehicle number signal from the first vehicle, an effect of reduction in the communication amount can be further expected. In this case, the transmitting satellite vehicle information generation means 107 in the second vehicle 111 generates and communicates the satellite vehicle information to be transmitted, from the last received requested satellite vehicle number signal.

In step 208, whether it is a relative position calculation cycle is determined, and when it is the relative position calculation cycle, a message is transmitted to the relative position calculation means 110 and the processing proceeds to step 209. When it is not the relative position calculation cycle, the processing proceeds to step 214. The relative position calculation cycle is determined according to an elapse of a certain period of time or may be another trigger such as reception of the message from the communication means 105.

In steps 209 to 213, processing in the relative position calculation means 110 is executed.

In step 209, whether the initialization flag is "1" or "0" is determined. "1" is set to the initialization flag in the case where the relative position has been calculated even once, and "0" is set to the initialization flag in the case where the relative position has not been calculated even once. In the case where the initialization flag is "1", the processing proceeds to step 210, and in the case where the initialization flag is "0", the processing proceeds to step 211.

Figure 5:
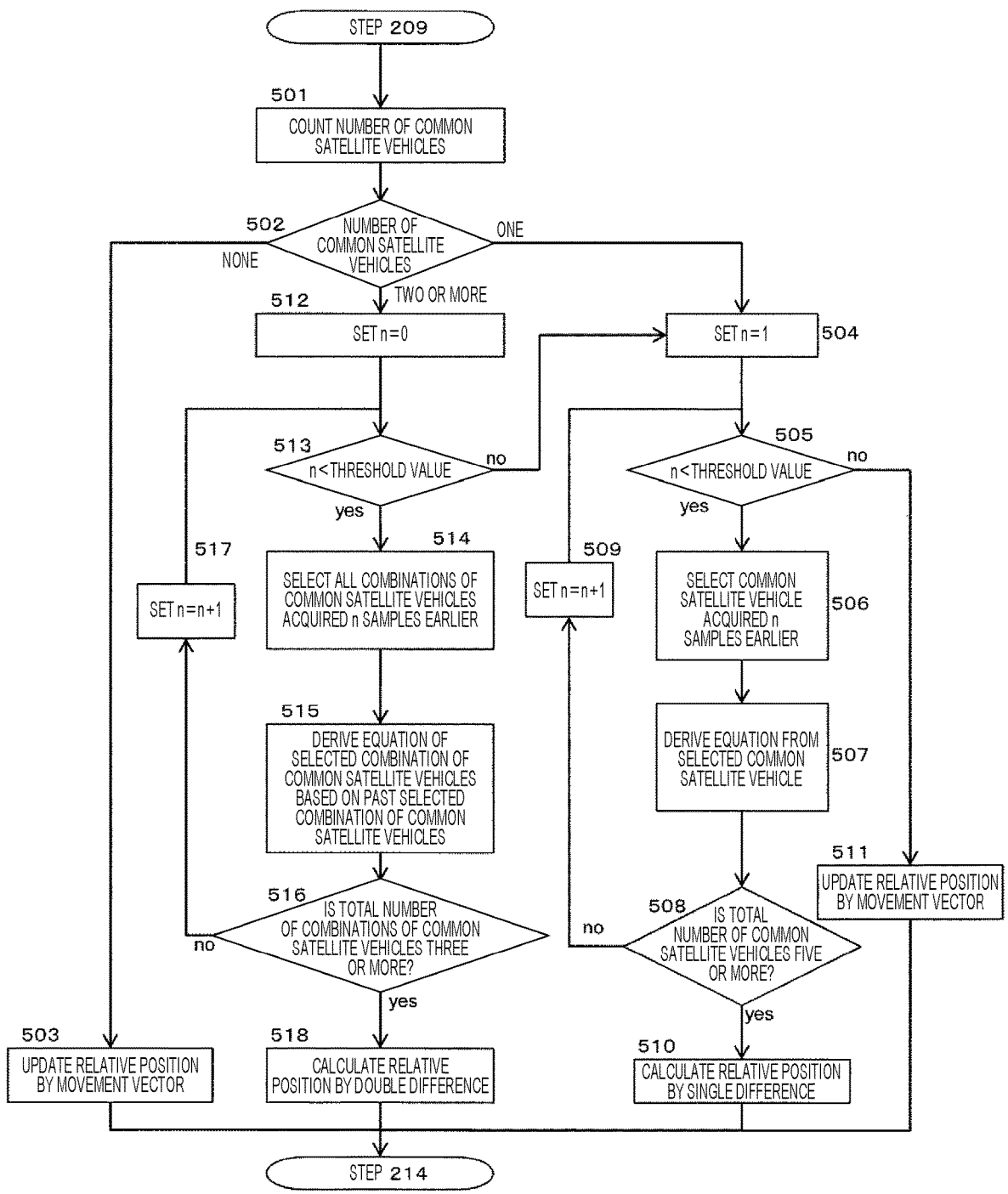
FIG. 5 illustrates a flow of processing of calculating a relative position having an initial value.

In step 210, since the relative position has been calculated even once, the position can be used as the initial value. FIG. 5 illustrates a processing flow of relative position calculation in step 210.

First, in step 501, the number of common satellite vehicles 302 is counted from the second vehicle information storage means 109 and the processing proceeds to step 502.

In step 502, the number of common satellite vehicle numbers is determined. In a case where there is no common satellite vehicle numbers, the processing proceeds to step 503. In a case where the number of common satellite vehicles is 1, the processing proceeds to step 504. In a case where the number of common satellite vehicles is two or more, the processing proceeds to step 512.

In step 503, since there is no common satellite vehicle, new positioning of the relative position cannot be performed. Therefore, a technique of updating a previous relative position from the movement vector is adopted. The relative position is updated by the following flow. The relative position is expressed as (Lx, Ly, Lz) as coordinates setting the first vehicle as an origin. The movement vector of the relative position (delta Lx, delta Ly, delta Lz) is obtained as follows where the movement vector of the first vehicle is given by (delta $x_A$, delta $y_A$, delta $z_A$) and the movement vector of the second vehicle is given by (delta $x_B$, delta $y_B$, delta $z_B$).

$$\begin{pmatrix} \delta Lx \\ \delta Ly \\ \delta Lz \end{pmatrix} = \begin{pmatrix} \delta x_B \\ \delta y_B \\ \delta z_B \end{pmatrix} - \begin{pmatrix} \delta x_A \\ \delta y_A \\ \delta z_A \end{pmatrix} \quad \text{[Equation 2]}$$

Therefore, a predicted relative position (Lx, Ly, Lz) becomes as follows from the previous relative position ($Lx_0$, $Ly_0$, $Lz_0$).

$$\begin{pmatrix} Lx \\ Ly \\ Lz \end{pmatrix} = \begin{pmatrix} Lx_0 \\ Ly_0 \\ Lz_0 \end{pmatrix} + \begin{pmatrix} \delta Lx \\ \delta Ly \\ \delta Lz \end{pmatrix} \quad \text{[Equation 3]}$$

The relative position updated in this way is outputted as a provisional relative position, and the processing terminates step 210 and proceeds to step 214.

In a case where the number of common satellite vehicles is 1, in step 504, n that is a counter for referring to past data of n sample time earlier is set to 1, and the processing proceeds to step 505.

In step 505, whether n is equal to or smaller than a threshold value is determined. In a case where n is smaller than the threshold value, the processing proceeds to step 506, and in a case where n is equal to or larger than the threshold value, the processing proceeds to step 511. The threshold value for referring to the past data of n sample time earlier is determined according to how long an error included in the satellite vehicle information can be regarded as the same. Here, the error included in the satellite vehicle information is an error delta t of an internal clock of the satellite vehicle signal reception means 103 mounted in the first vehicle and the second vehicle, and a noise "epsilon" given from the outside to the satellite vehicle signal reception means 103.

In step 506, the common satellite vehicle acquired n samples earlier from the present is selected from the first vehicle information storage means 108 and the second vehicle information storage means 109, and the processing proceeds to step 507.

In step 507, an equation is derived from the common satellite vehicle acquired in step 506. The equation is obtained as follows.

Assume that the distance from a satellite vehicle receiving antenna (hereinafter, antenna) of each vehicle to the satellite vehicle is represented by $p_{iA}$. The first subscript represents a satellite vehicle i, the second A represents an antenna A (first vehicle) and an antenna B (second vehicle), and $p_{iA}$ is the distance from the antenna A of the first vehicle to the satellite vehicle i. At this time, the equation is expressed as follows.

$$p_{iB} - p_{iA} = \begin{pmatrix} ex_{iA} \\ ey_{iA} \\ ez_{iA} \\ c \\ 1 \end{pmatrix} \begin{pmatrix} Lx - \delta Lx \\ Ly - \delta Ly \\ Lz - \delta Lz \\ \delta t \\ \varepsilon \end{pmatrix} \quad \text{[Equation 4]}$$

Note that c is the velocity of light, (delta Lx, delta Ly, delta Lz) is the movement vector of the relative position, the error of the internal clock is delta t, the noise given from the outside to the satellite vehicle signal reception means 103 is epsilon, and x, y, and z components of a line-of-sight vector from the antenna of the first vehicle to the satellite vehicle i are $ex_{iA}$, $ey_{iA}$, $ez_{iA}$.

The line-of-sight vector is a vector extending in a direction of each satellite vehicle 120 from the satellite vehicle signal reception means 103 and is expressed by a unit vector of length 1. The position of the satellite vehicle signal reception means 103 is calculated using a positioning means.

However, in a case where there is no positioning means or in a case where the position of the satellite vehicle signal reception means 103 cannot be calculated by the positioning means, the position may be calculated/estimated by an alternative means. An example includes a method of calculating a position by matching a characteristic point of a video of a camera or the like with a characteristic point recorded on a map or the like, as in JP 2016-142624 A.

This equation is obtained by the number of selected common satellite vehicles, and the processing proceeds to step 508 together with the equations obtained before this time.

In step 508, whether a total number of the equations obtained in step 507 is five or more is determined. In a case where the total number of the obtained equations is smaller than five, the processing proceeds to step 509, n is incremented by one, and the processing from step 505 to step 508 is repeated. In a case where the number of the obtained equations is five or more, five equations are established for unknown number 5, and thus the processing proceeds to step 510 and the relative position is calculated.

In step 510, the relative position is obtained as follows. A least squares method of $L = (G_t G)_{-1} G_t P$ may just be solved for L as Equation 5 from Equation 4.

$$\begin{pmatrix} p_{iB} - p_{iA} + e \cdot \delta L \\ p_{i+1B} - p_{i+1A} + e \cdot \delta L \\ \vdots \\ p_{qB} - p_{qA} + e \cdot \delta L \\ p_{rB} - p_{rA} + e \cdot \delta L \end{pmatrix} = \quad \text{[Equation 5]}$$

$$\begin{pmatrix} ex_{iA} & ey_{iA} & ez_{iA} & c & 1 \\ ex_{i+1A} & ey_{i+1A} & ez_{i+1A} & c & 1 \\ \vdots & \vdots & \vdots & \vdots & \vdots \\ ex_{qA} & ey_{qA} & ez_{qA} & c & 1 \\ ex_{rA} & ey_{rA} & ez_{rA} & c & 1 \end{pmatrix} \cdot \begin{pmatrix} Lx \\ Ly \\ Lz \\ \delta t \\ \varepsilon \end{pmatrix} \Leftrightarrow P = GL$$

Further, a weight matrix W may be created from the distance errors 305 stored in the first vehicle information storage means 108 and the second vehicle information storage means 109, and a weighted least squares method of $L=(G_t WG)_{-1} G_t WP$ may be solved. The relative position is calculated in this way, and the processing terminates step 210 and proceeds to step 214.

Further, in a case where the threshold value becomes n or more in step 505, the relative position is updated with the movement vector in step 511. This processing is the same as step 503 described above.

Next, a case in which the number of common satellite vehicles becomes two or more in step 502 will be described.

In step 512, the value of n is set similarly to step 504. Note that beginning of the value of n is set to 0 in the case where the number of common satellite vehicles is two or more.

Next, in step 513, whether n is equal to or smaller than the threshold value is determined. In a case where n is equal to or smaller than the threshold value, the processing proceeds to step 514, and in a case where n is larger than the threshold value, the processing proceeds to step 504 and the same processing as when the number of common satellite vehicles is one is performed.

In step 514, a combination of the common satellite vehicles acquired n samples earlier from the present is selected from the first vehicle information storage means 108 and the second vehicle information storage means 109, and the processing proceeds to step 515. The difference between the number of common satellite vehicle is two or more and one is a difference between whether considering the combination of common satellite vehicles and whether counting the number of common satellite vehicles.

Next, in step 515, an equation is derived from the combination of common satellite vehicles acquired in step 514. The equation is obtained as follows.

Assume that the distance from a satellite vehicle receiving antenna (hereinafter, antenna) of each vehicle to the satellite vehicle is represented by $p_{iA}$. The first subscript represents a satellite vehicle i, the second A represents an antenna A (first vehicle) and an antenna B (second vehicle), and $p_{iA}$ is the distance from the antenna A of the first vehicle to the satellite vehicle i. At this time, the equation is expressed as follows.

$$(p_{iB} - p_{iA}) - (p_{jB} - p_{jA}) = \left( \begin{pmatrix} ex_{iA} \\ ey_{iA} \\ ez_{iA} \end{pmatrix} - \begin{pmatrix} ex_{jA} \\ ey_{jA} \\ ez_{jA} \end{pmatrix} \right) \cdot \begin{pmatrix} Lx \\ Ly \\ Lz \end{pmatrix}$$ [Equation 6]

Note that $ex_{iA}$, $ey_{iA}$, and $ez_{iA}$ are the x, y, and z components of the line-of-sight vector from the antenna of the first vehicle to the satellite vehicle i, respectively.

This equation is obtained by the number of selected combinations of common satellite vehicles, and the processing proceeds to step 516 together with the equations obtained before this time.

In step 516, whether a total number of the equations obtained in step 515 is three or more is determined. In a case where the total number of the obtained equations is smaller than three, the processing proceeds to step 517, n is incremented by one, and the processing from step 513 to step 516 is repeated. In a case where the number of the obtained equations is three or more, three equations are established for unknown number 3, and thus the processing proceeds to step 518 and the relative position is calculated.

In step 518, the relative position is obtained as follows. A least squares method of $L=(G_t G)_{-1} G_t P$ may just be solved for L as Equation 7 from Equation 6.

$$\begin{pmatrix} (p_{iB} - p_{iA}) - (p_{jB} - p_{jA}) \\ \vdots \\ (p_{qB} - p_{qA}) - (p_{rB} - p_{rA}) \end{pmatrix} =$$ [Equation 7]

$$\begin{pmatrix} ex_{iA} - ex_{jA} & ey_{iA} - ey_{jA} & ez_{iA} - ez_{jA} \\ \vdots & \vdots & \vdots \\ ex_{qA} - ex_{rA} & ey_{qA} - ey_{rA} & ez_{qA} - ez_{rA} \end{pmatrix} \cdot \begin{pmatrix} Lx \\ Ly \\ Lz \end{pmatrix} \Leftrightarrow P = GL$$

Further, a weight matrix W may be created from the distance errors 305 stored in the first vehicle information storage means 108 and the second vehicle information storage means 109, and a weighted least squares method of $L=(G_t WG)_{-1} G_t WP$ may be solved. The relative position is calculated in this way, and the processing terminates step 210 and proceeds to step 214.

Further, in step 209, in a case where the initialization flag is not 1, that is, in a case where the relative position has not been calculated even once, the processing proceeds to step 211 and attempts calculation of the relative position as the initial value.

Figure 6:
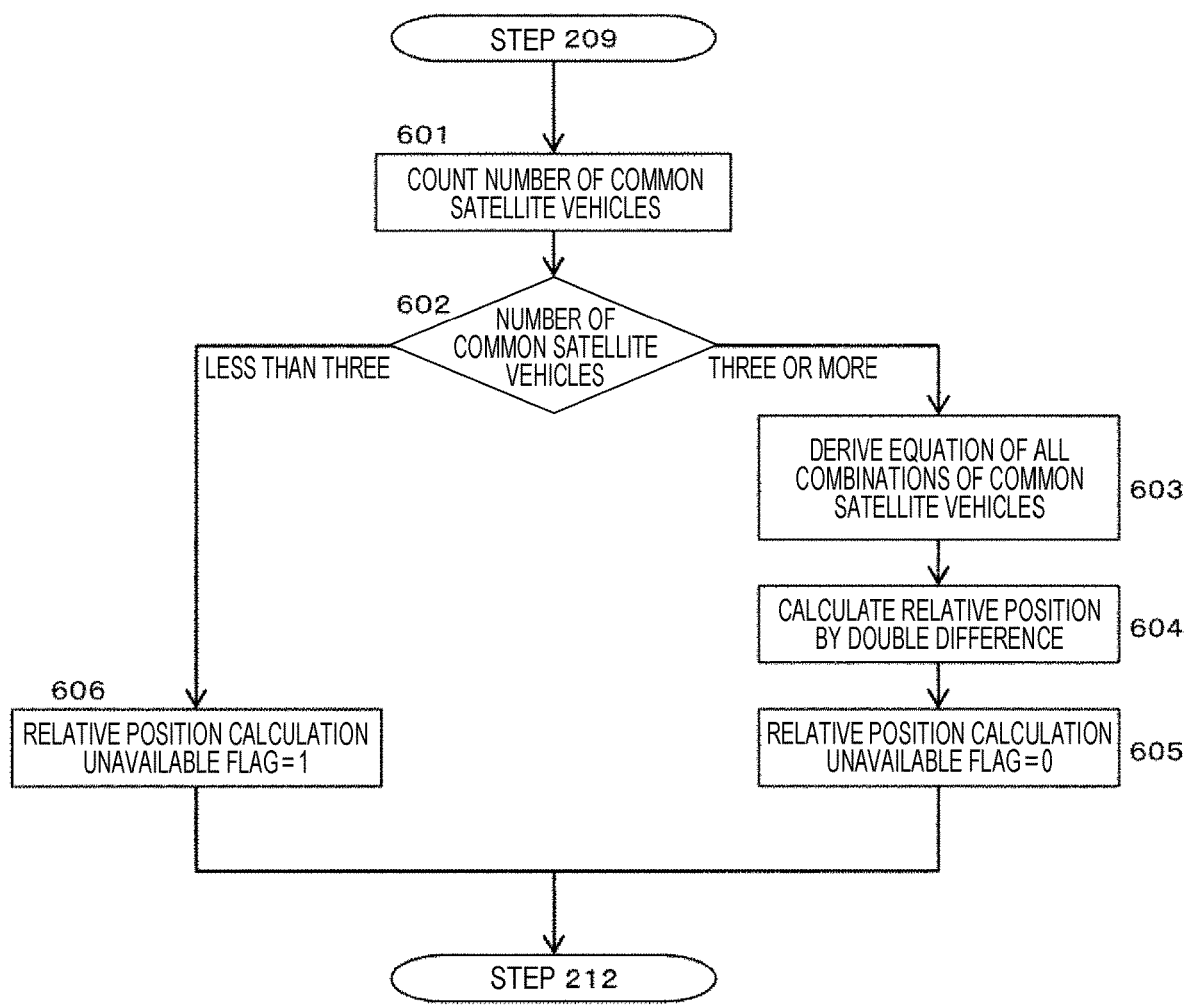
FIG. 6 illustrates a flow of processing of calculating a relative position to serve as an initial value.

FIG. 6 illustrates a processing flow of calculation of the relative position as the initial value in step 211.

First, in step 601, the number of common satellite vehicles 302 is counted from the second vehicle information storage means 109 and the processing proceeds to step 602.

In step 602, the number of common satellite vehicle numbers is determined. In a case where the number of common satellite vehicles is three or more, the processing proceeds to step 603, and in a case where the number of common satellite vehicles is less than three, the processing proceeds to step 606.

In the case where the number of common satellite vehicles is three or more, in step 603, equations are derived from combinations of all the common satellite vehicles obtained in step 601. The equation can be similarly obtained to the described-above Equation (5). The equations are obtained by the number of the combinations of all the obtained common satellite vehicles, and the processing proceeds to step 604.

In step 604, the relative position is obtained by the same method as the method described in step 518 from the equations obtained in step 603. The relative position is calculated, and in step 605, a relative position calculation unavailable flag is set to "0", that is, set to indicate that the initial value of the relative position has been already calculated, and the processing terminates step 211 and proceeds to step 212.

Further, in a case where the number of common satellite vehicles is less than three in step 602, in step 606, the relative position calculation unavailable flag is set to "1", that is, set to indicate that the initial value of the relative position has not been calculated yet, and the processing terminates step 211 and proceeds to step 212.

Next, in step 212, whether the value of the relative position calculation unavailable flag set in step 211 is "0" or "1" is determined. In a case where the value of the relative position calculation unavailable flag is "0", the processing proceeds to step 213, a state where the relative position with the initialization flag of "1", that is, the relative position as the initial value has been calculated is set, and the processing proceeds to step 214.

In a case where the value of the relative position calculation unavailable flag "1" is in step 212, the processing directly proceeds to step 214.

As described above, when the relative position is calculated by the relative position calculation means 110 and the relative position is output by the vehicle to vehicle communication device, in step 214, whether an engine and the like of the first vehicle have been stopped is determined. In a case where it can be determined that the engine has been stopped, that is, no further operation is performed, all the processing in the vehicle to vehicle communication device 102 are terminated. In a case where the engine has not been stopped, that is, there is a possibility that the first vehicle still operates, the processing returns to step 202, and the processing from step 202 to step 213 or 214 is repeated.

The vehicle to vehicle communication device with the relative position calculation function operates as described above. Use of the vehicle to vehicle communication device with the relative position calculation function of the present invention efficiently limits the plurality of pieces of satellite vehicle information and enables communication with the second vehicle by adding the processing in requested satellite vehicle number generation means 106 and the transmitting satellite vehicle information generation means 107, and significantly reduces the communication amount, as compared with the technique described in the background art. The above-described embodiment relates to communication between vehicles. However, similar effects can be obtained by a similar method even in a case where communication is performed with a second vehicle that is a satellite vehicle positioning means attached to a fixed pillar or the like. In this case, the kinematic acquisition means 104 of the second vehicle 111 is unnecessary, and a velocity vector to be communication is transmitted as (0, 0, 0)

That is, the processing in step 503 is different from the above description, and when the movement vector of the second vehicle is given as (0, 0, 0), the movement vector (delta Lx, delta Ly, delta Lz) of the relative position becomes the value itself obtained from the kinematic acquisition means 104 of the first vehicle.

REFERENCE SIGNS LIST 101 first vehicle
102 vehicle to vehicle communication device
103 satellite vehicle signal reception means
104 kinematic acquisition means
105 communication means
106 requested satellite vehicle number generation means
107 transmitting satellite vehicle information generation means
108 first vehicle information storage means
109 second vehicle information storage means
110 relative position calculation means
111 second vehicle
120 satellite vehicle

The invention claimed is:

1. A vehicle to vehicle communication device, at a first vehicle, comprising:
   a satellite vehicle signal reception means configured to decode one or more signals from one or more satellite vehicles to receive satellite vehicle information for each satellite vehicle, respectively;
   a communication means configured to transmit first velocity vectors of the first vehicle to a second vehicle and configured to receive second satellite vehicle information, and second velocity vectors representing a motion of the second vehicle;
   a kinematic acquisition means configured to measure or calculate the first velocity vectors of the first vehicle;
   a positioning means configured to calculate a position of the first vehicle based on position information received from the satellite vehicle signal reception means;
   a first vehicle information storage means configured to store first satellite vehicle information and the first velocity vectors of the first vehicle with respect to each time they are received at the first vehicle information storage means;
   a second vehicle information storage means configured to store satellite vehicle information and the second velocity vectors of the second vehicle with respect to each time they are received at the second vehicle information storage means;
   a relative position calculation means configured to calculate a relative position from the first velocity vectors of the first vehicle, the second velocity vectors of the second vehicle, and the satellite vehicle information of the first and second vehicles;
   a requested satellite vehicle number generation means configured to, in response to a satellite number request from the second vehicle, generate a satellite vehicle number notifying the second vehicle of a satellite vehicle number assigned to the second vehicle by the first vehicle based on a priority order determined by the requested satellite vehicle number generation means for the second vehicle and one or more other satellite vehicles; and
   a transmitting satellite vehicle information generation means configured to generate, from the satellite vehicle information corresponding to the satellite vehicle number requested by the second vehicle, information to be sequentially transmitted to the second vehicle in the determined priority order up to an amount falling within a predetermined allowable communication amount for the communication means, the predetermined allowable communication amount is calculated based at least upon a total number of vehicles communicating with the first vehicle at a particular point in time,
   wherein based on the determined priority order and the predetermined allowable communication amount for the communication means, the relative position can be calculated with greater accuracy by decreasing the allowable communication amount as the total number of vehicles increases while maintaining communication with vehicles having higher priority.

2. The vehicle to vehicle communication device according to claim 1, wherein
   the requested satellite vehicle number generation means determines an existence or non-existence of a previous calculation of a relative position between the first and second vehicle, and
   in a case where the requested satellite vehicle number generation means determines that the calculation of the relative position does not exist, the transmitting satellite vehicle information generation means transmits at least three pieces of satellite vehicle information.

3. The vehicle to vehicle communication device according to claim 1, wherein, in a case where a satellite vehicle number previously generated and the satellite vehicle number generated based on the satellite number request from the second vehicle have sequences of satellite vehicle numbers where part or all of the priorities in a descending order of the determined priority orders are the same, the requested satellite vehicle number generation means does not transmit the satellite vehicle number to the second vehicle.

* * * * *